(12) United States Patent
Nanko

(10) Patent No.: US 6,612,950 B2
(45) Date of Patent: Sep. 2, 2003

(54) FRONT DERAILLEUR MOUNTING ARRANGEMENT

(75) Inventor: Yoshiaki Nanko, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/984,986

(22) Filed: Oct. 31, 2001

(65) Prior Publication Data

US 2003/0083163 A1 May 1, 2003

(51) Int. Cl.[7] .............................................. F16H 63/00
(52) U.S. Cl. ................................................ 474/82; 474/80
(58) Field of Search .............................. 474/80, 81, 82

(56) References Cited

U.S. PATENT DOCUMENTS

| | | | | | |
|---|---|---|---|---|---|
| 4,330,137 A | * | 5/1982 | Nagano | ........................ | 280/238 |
| 5,496,222 A | | 3/1996 | Kojima et al. | | |
| 5,620,384 A | * | 4/1997 | Kojima et al. | ................. | 474/82 |
| 5,728,018 A | * | 3/1998 | Terada et al. | .................. | 474/80 |
| 5,846,148 A | * | 12/1998 | Fujii | ............................ | 474/80 |
| 6,117,032 A | * | 9/2000 | Nankou | ........................ | 474/80 |
| 6,277,044 B1 | * | 8/2001 | Fujimoto | ...................... | 474/80 |

* cited by examiner

Primary Examiner—Thomas R. Hannon
Assistant Examiner—Vicky A. Johnson
(74) Attorney, Agent, or Firm—Shinjyu Global IP Counselors, LLP

(57) ABSTRACT

A front derailleur mounting arrangement includes a bottom bracket tube and a front derailleur mounting bracket having first and second complementary mounting structures. The first and second complementary mounting structures are configured to retain the front derailleur mounting bracket in a predetermined rotational orientation and a predetermined axial orientation on an axial end edge of the bottom bracket tube prior to threading of a bottom bracket within the interior threaded passage of the bottom bracket tube. One of the first and second complementary mounting structures is formed as a slot and the other of the first and second complementary mounting structures is formed as a projection that mates with the slot.

32 Claims, 10 Drawing Sheets

FRONT DERAILLEUR MOUNTING ARRANGEMENT

BACKGROUND OF THE INVENTION

1. Field of the Invention

This invention generally relates to a front derailleur for a bicycle. More specifically, the present invention relates a front derailleur mounting arrangement that mounts the front derailleur to a bottom bracket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. The various components of the bicycle are usually mounted to the bicycle frame. Some components of the bicycle that have been extensively redesigned are the front derailleurs.

Generally, a front derailleur is typically secured to the seat tube of the bicycle frame and/or the bottom bracket of the bicycle. Basically, the front derailleur has a fixed member secured to the bicycle frame in a non-movable, and a movable member supported to be movable relative to the fixed member via a linkage mechanism. The movable member supports a chain guide having a pair of vertical surfaces for contacting a chain.

In recent years, bicycle frames have been provided with rear suspensions. As result of these rear suspensions, often the seat tube of the bicycle frame is removed or cut away to accommodate the rear suspension. In order to accommodate a seat tube type of rear derailleur mounting arrangement, a short seat tube must be left or added to the bicycle frame. However, in some instances it is not possible to add an additional piece of framing material where the seat tube is normally located. In such circumstances, a bottom bracket type of front derailleur mounting arrangement must be utilized. One problem with the bottom bracket type of front derailleur mounting arrangement is that it is sometimes difficult to install. In other words, the installer usually must hold the mounting bracket while installing the bottom bracket into the bottom bracket tube of the frame. Thus, the installer can only use one hand to thread the bottom bracket into the seat tube. This can be difficult since the bottom bracket is often installed utilizing a pneumatic tool that can be heavy and/or awkward to handle with one hand.

In view of the above, there exists a need for a front derailleur mounting arrangement which overcomes the above mentioned problems in the prior art. This invention addresses this need in the prior art as well as other needs, which will become apparent to those skilled in the art from this disclosure.

SUMMARY OF THE INVENTION

One object of the present invention is to provide a front derailleur mounting arrangement that aids in the mounting of the bottom bracket and the front derailleur to the bicycle frame.

Another object of the present invention is to provide a front derailleur mounting arrangement that relatively simple and inexpensive to manufacture and assembly.

The foregoing objects can basically be attained by providing a front derailleur mounting arrangement comprising a bottom bracket tube and a front derailleur mounting bracket. The bottom bracket tube has an interior threaded passage with a center axis and a first complementary mounting structure. The front derailleur mounting bracket includes a lower attachment portion with a bottom bracket opening and a second complementary mounting structure, and an upper derailleur support portion extending from the lower attachment portion. The upper derailleur support portion has a derailleur mounting part. One of the first and second complementary mounting structures is configured to form a slot and the other of the first and second complementary mounting structures is configured to form a projection. The projection mates with the slot to retain the front derailleur mounting bracket in a predetermined rotational orientation and a predetermined axial orientation on an axial end edge of the bottom bracket tube prior to threading of a bottom bracket within the interior threaded passage of the bottom bracket tube.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
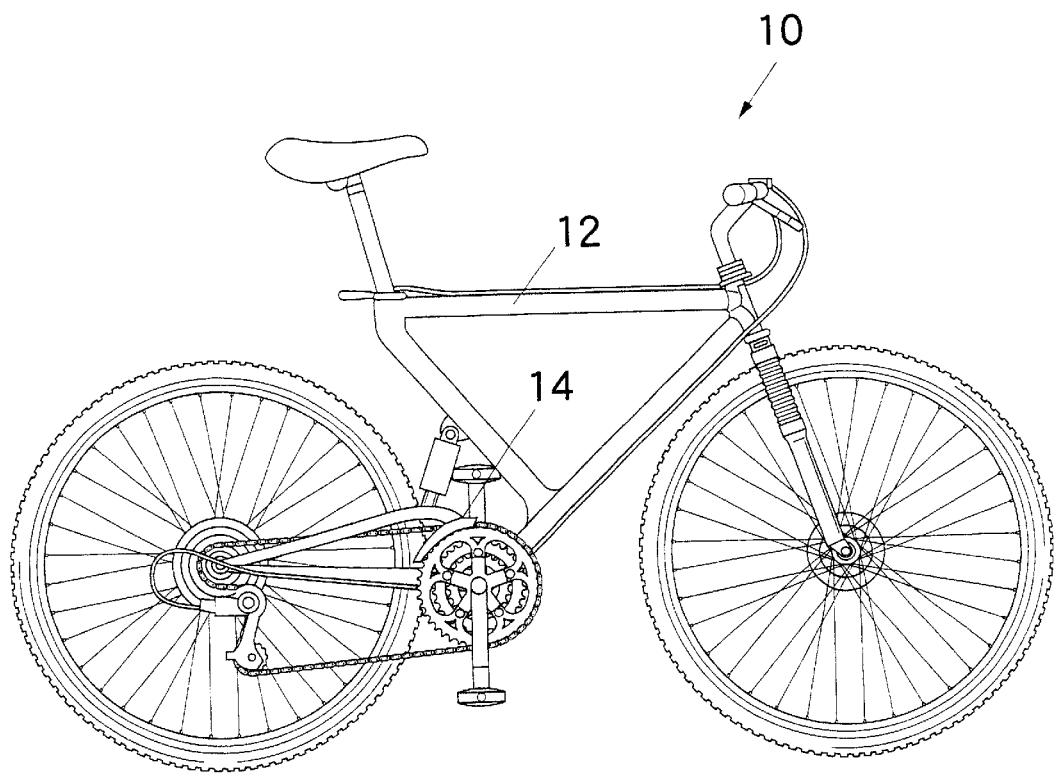
FIG. 1 is a side elevational view of a bicycle with a front derailleur in accordance with the present invention.
Figure 2:
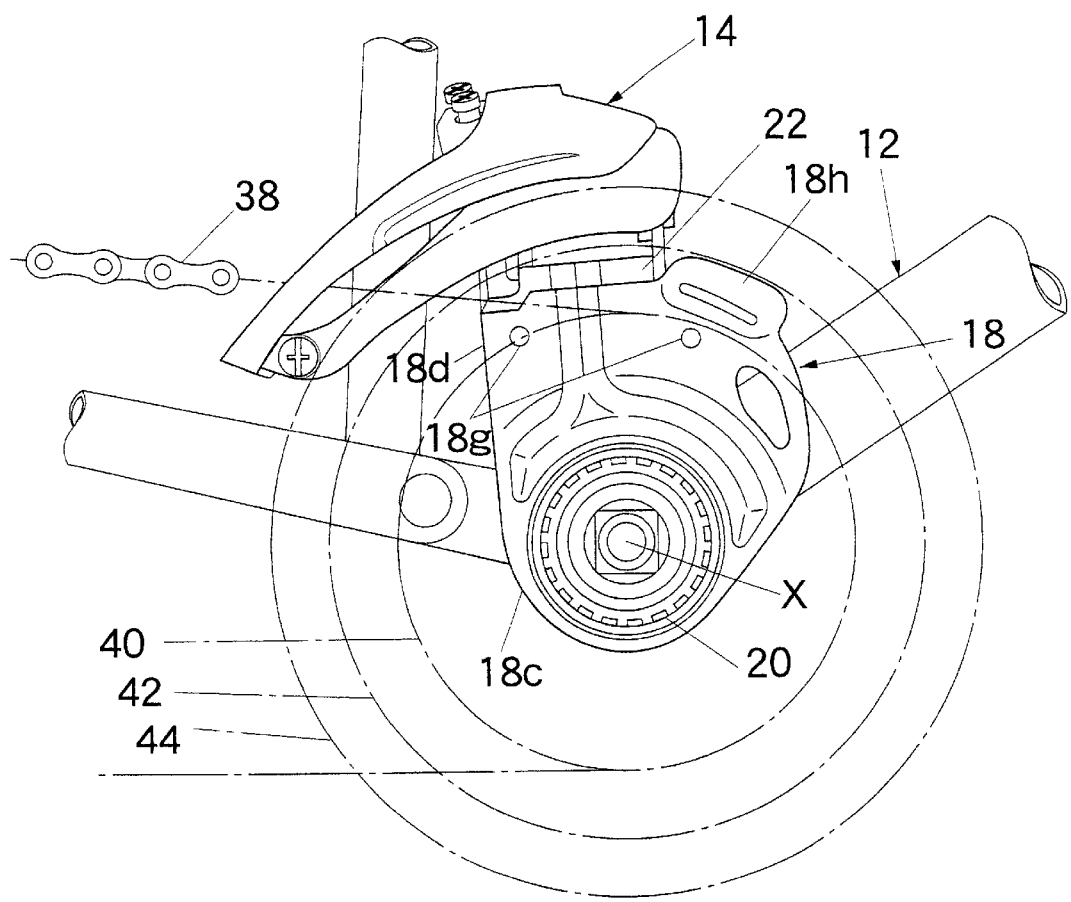
FIG. 2 is an enlarged partial side elevational view of a portion of the bicycle frame with the front derailleur mounted to the bottom bracket by a front derailleur mounting member in accordance with a first embodiment of the present invention.
Figure 3:
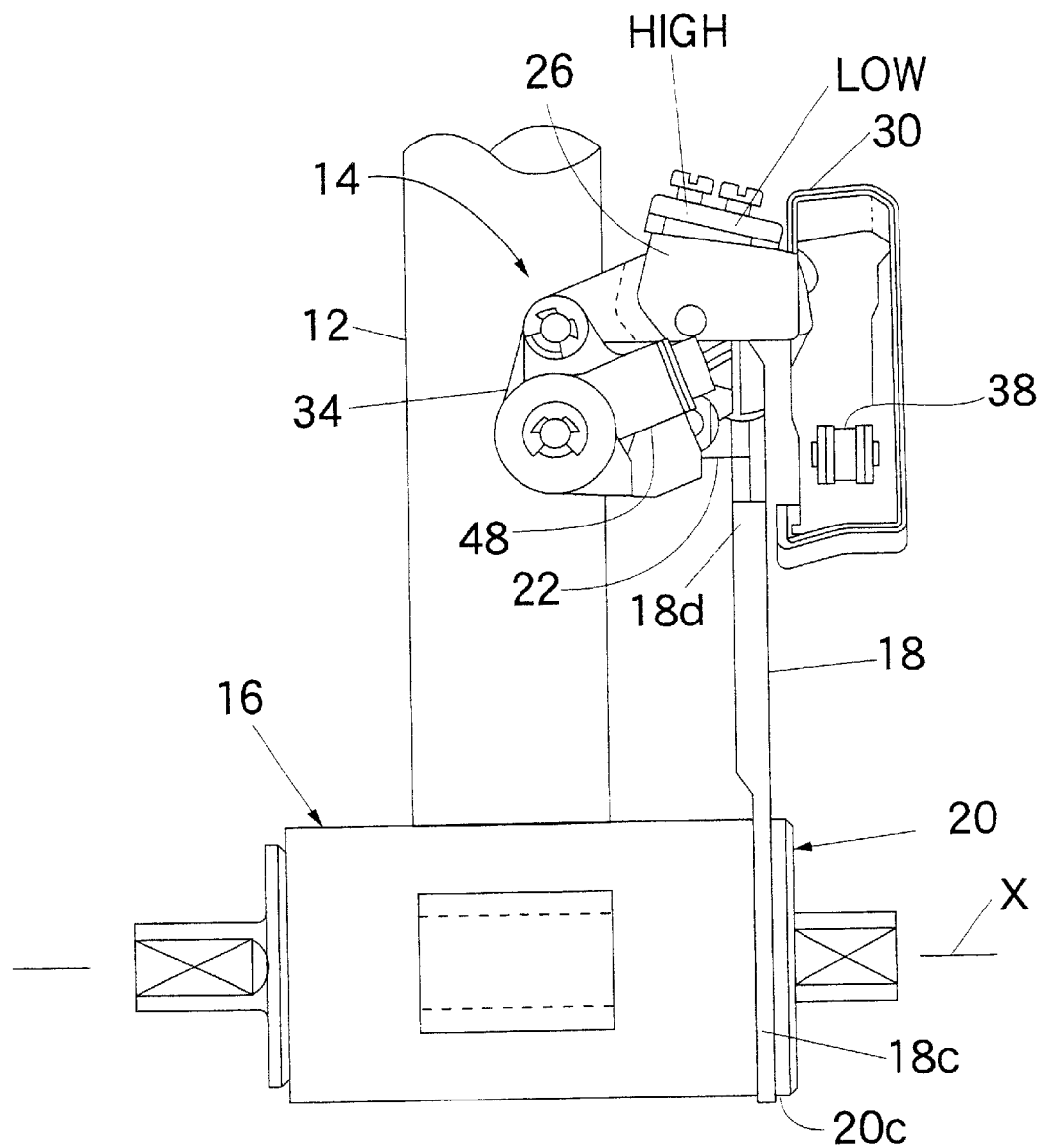
FIG. 3 is a rear view of the portion of the bicycle frame, the front derailleur and the front derailleur mounting member illustrated in FIG. 2.
Figure 4:
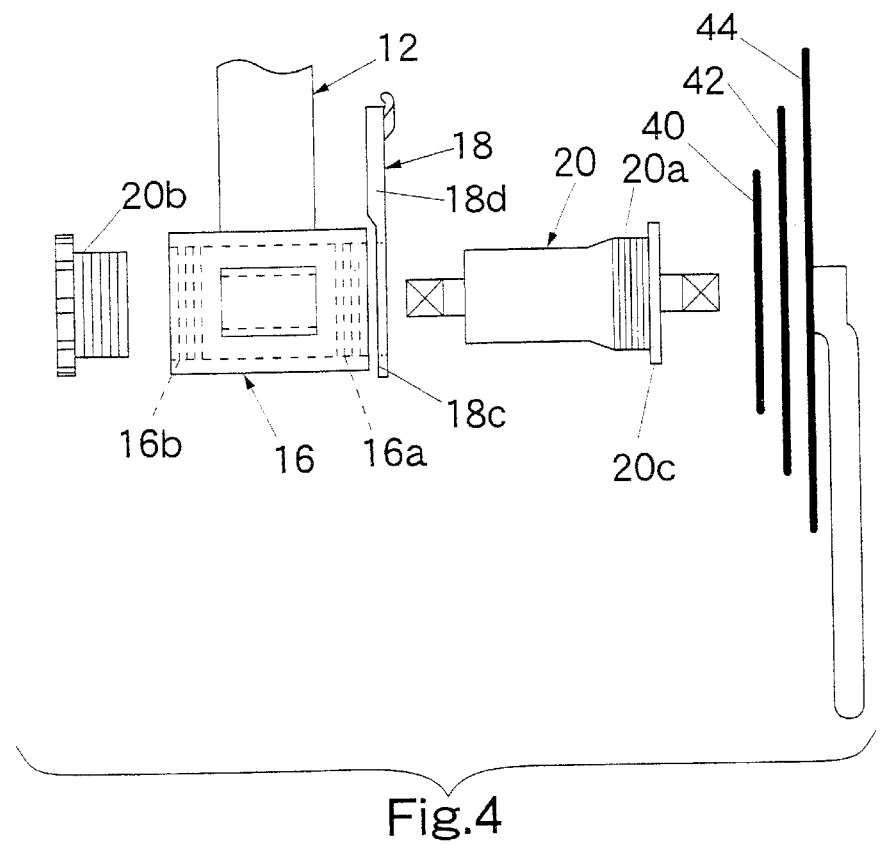
FIG. 4 is a rear end exploded elevational view of a portion of the bicycle frame, the bottom bracket, the front derailleur mounting member in accordance with the first embodiment of the present invention illustrated in FIGS. 2 and 3.

Referring initially to FIGS. 1–3, a bicycle 10 is illustrated having a frame 12 with a front derailleur 14 fixedly coupled to a bottom bracket tube 16 of the frame 12 via a front derailleur mounting bracket or plate 18 in accordance with a first embodiment of the invention. As explained below, the front derailleur mounting bracket 18 is designed aid in the mounting of the front derailleur 14. Moreover, the front derailleur mounting bracket 18 is especially useful with a bicycle frame that does not have a seat tube such as the frame 12 illustrated herein. In other words, the front derailleur mounting bracket 18 is fixedly secured to the bottom bracket tube 16 of the frame 12 by a bottom bracket 20.

Bicycles and their various components are well known in the art, and thus, bicycle 10 and its various components will not be discussed or illustrated in detail herein except for the components that relate to the present invention. In other words, only front derailleur 14 and the components that relate thereto will be discussed and/or illustrated herein. As used herein, the terms "laterally toward the bicycle," "laterally away from the bicycle," "upper," "lower," "forward", "rearward", "upward", "above", "downward", "below" and "transverse" refer to those directions of a bicycle in its normal riding position, to which front derailleur 14 is attached by the front derailleur mounting bracket or plate 18. Accordingly, these terms, as utilized to describe the front derailleur 14 in the claims, should be interpreted relative to bicycle 10 in its normal riding position. In other words, as used herein, these terms are to be determined from FIGS. 1 and 2, where the forward or front direction is toward the right in FIGS. 1 and 2, and the rear or back direction is toward the left in FIGS. 1 and 2.

As best seen in FIG. 3, the front derailleur 14 basically includes a fixed base member 22 for mounting the front derailleur 14 to the bicycle frame 12, a movable member 26 supporting a chain guide 30, and a linkage mechanism 34 for coupling the movable member 26 to the base member 22. The chain guide 30 acts as a guide for moving the chain 38 between a small sprocket 40, a middle sprocket 42 and a large sprocket 44 in response to tension applied by a derailleur cable (not shown) to an actuating arm 48 in a known manner The front derailleur 14 is operated by movement of a shifting unit (not shown) in a conventional manner. The front derailleurs are conventional components that are well known in the art. Since front derailleurs are well known in the art, the front derailleur 14 will not be discussed or illustrated in detail herein. FIG. 2 is a side view of a portion of the frame 12 that includes the bottom bracket tube 16 on which the front derailleur 14 is mounted using the mounting plate 18 according to the present invention as explained below.

As best seen in FIG. 2, the bottom bracket tube 16 of the frame 12 is a hollow tubular member with an interior passage having a center longitudinal axis X. Each end of the bottom bracket tube 16 is a threaded portion 16a and 16b, respectively, to securely fasten a bottom bracket 20 therein. The bottom brackets are conventional components that are well known in the art. Since bottom brackets are well known in the art, the bottom bracket 20 will not be discussed or illustrated in detail herein. Preferably, the threaded portion 16a has left hand threads, while the threaded portion 16b has right hand threads. The threaded portion 16a threadedly engages the left hand threads 20a of the bottom bracket 20, while the threaded portion 16b threadedly engages the right hand threads 20b of the bottom bracket 20. The bottom bracket 20 has a flange 20c that contacts the front derailleur mounting bracket 18 when the bottom bracket 20 is screwed into the opening of the bottom bracket tube 16 to retain the front derailleur mounting bracket 18 to the bottom bracket tube 16 of the frame 12.

Figure 6:
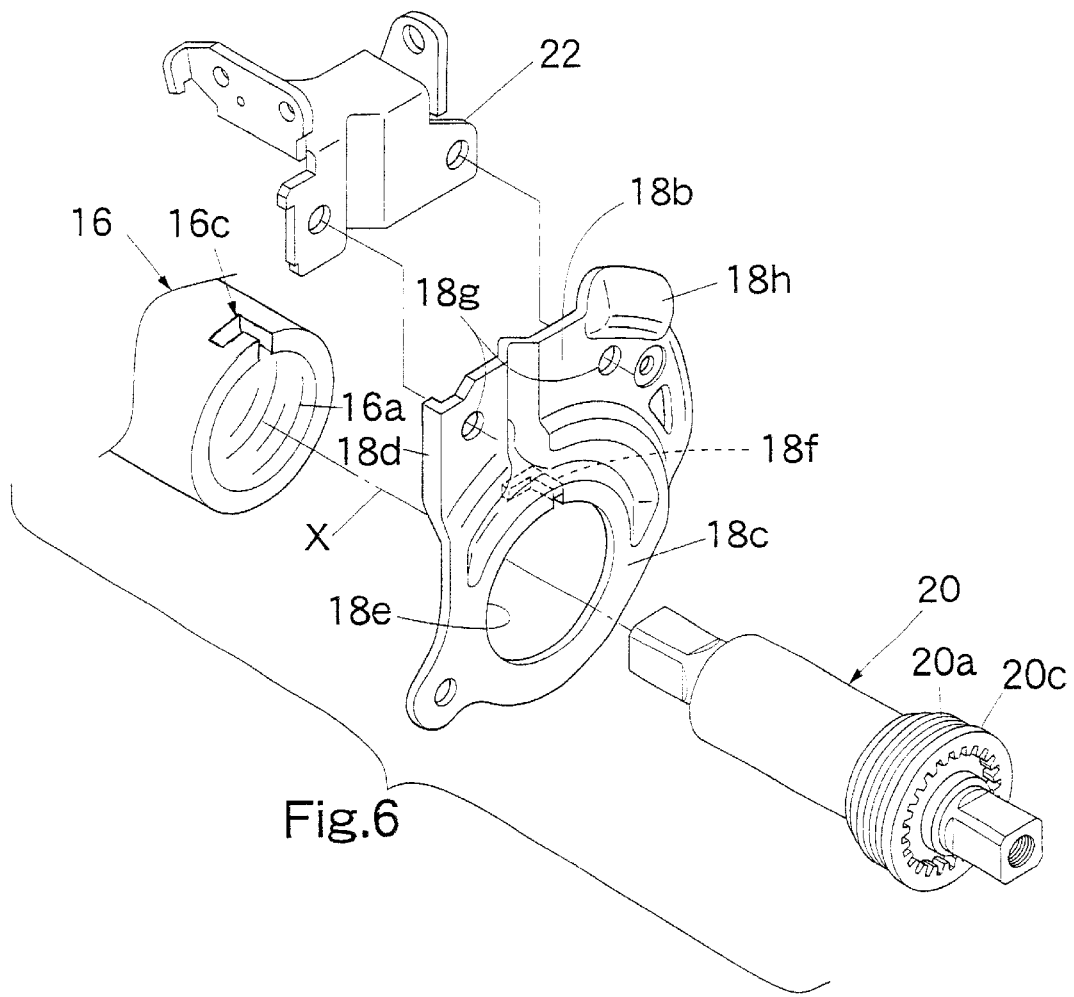
FIG. 6 is a partial exploded perspective view of a portion of the bottom bracket tube of the bicycle frame, the front derailleur mounting member and the bottom bracket illustrated in FIGS. 2–5.
Figure 7:
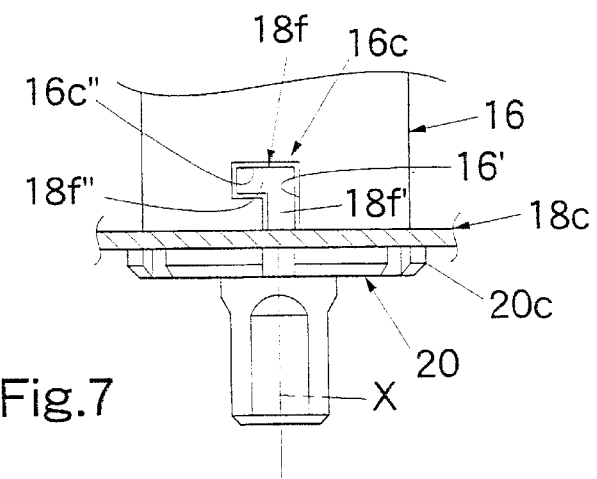
FIG. 7 is a partial top plan view of a portion of the bottom bracket tube of the bicycle frame with the front derailleur mounting member shown in partial cross section illustrated in FIGS. 2–6.

As best seen in FIGS. 6 and 7, the bottom bracket tube 16 of the frame 12 has a slot 16c that forms a first complementary mounting structure for aiding in the assembly of the bottom bracket 20 and the front derailleur mounting bracket 18 to the bottom bracket tube 16. The slot 16c is configured to retain the front derailleur mounting bracket 18 in a predetermined rotational orientation and a predetermined axial orientation on an axial end edge of the bottom bracket tube 16 prior to threading of the bottom bracket 20 within the interior threaded passage of the bottom bracket tube 16 as discussed below in more detail. Accordingly, the installer needs to only insert a one end of the bottom bracket 20 within the interior threaded passage of the bottom bracket tube 16 to support the front derailleur mounting bracket 18 in the correct orientation. This allows to the installer to let go of the front derailleur mounting bracket 18 and use two hands to install the bottom bracket 20 within the interior threaded passage of the bottom bracket tube 16 with an air wrench. The slot 16c is an L-shaped notch that is formed in the axial end edge of the bottom bracket tube 16. In other words, the L-shaped slot 16c forms a notch with an open end 16c' located at the axial end edge of the bottom bracket tube 16 and a closed end 16c" spaced axially from the axial end edge of the bottom bracket tube 16. The open end 16c' of the L-shaped slot 16c extends in an axial direction, while the closed end 16c" of the L-shaped slot 16c extends in a circumferential direction. Thus, the open end 16c' of the L-shaped slot 16c has a first circumferential width and the closed end 16c" of the L-shaped slot 16c has a second circumferential width that is no smaller than the first circumferential width.

Figure 5:
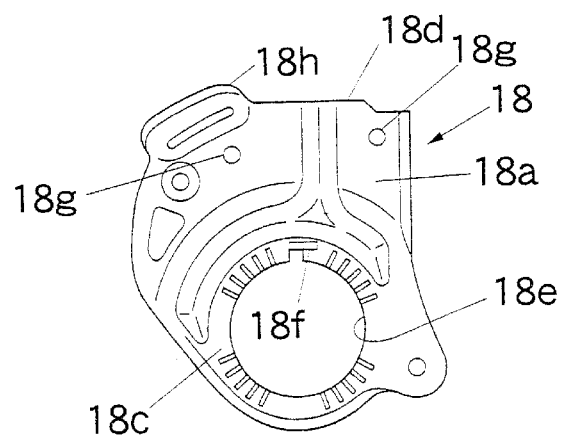
FIG. 5 is an inside elevational view of the front derailleur mounting member in accordance with the first embodiment of the present invention illustrated in FIGS. 2–4.

Referring to FIGS. 5 and 6, the front derailleur mounting plate 18 basically includes a support body in the form of a plate body having a first side 18a for facing laterally toward the bicycle frame 12, a second side 18b for facing laterally away from the bicycle frame 12. The first side 18a is illustrated in FIG. 5, while the second side 18b is illustrated in FIG. 6. The front derailleur mounting plate 18 is preferably a one-piece, unitary member having a lower attachment portion 18c and an upper derailleur support portion 18d extending from the lower attachment portion 18c. The lower attachment portion 18c has a bottom bracket opening 18e and a mounting projection 18f. The upper derailleur support portion 18d extends upwardly from the lower attachment portion 18c. The upper derailleur support portion 18d has a pair of holes 18g that form a derailleur mounting part. More specifically, the fixed base member 22 is fixedly secured to the upper derailleur support portion 18d by a pair of fasteners (not shown) that extend through the holes 18g. The front derailleur mounting plate 18 can be formed from any suitable material, including, but not limited to, plastic, fiberglass, aluminum, steel, etc.

The lower attachment portion 18c of the support body has the bottom bracket opening 18e that aligns with bottom bracket 20. In this embodiment, the bottom bracket opening 18e has substantially the same diameter as the corresponding opening of the interior passage of the bottom bracket tube 16 of the bicycle frame 12. In any event, the first side 18a of the lower attachment portion 18c aligns with the bottom bracket tube 16 when the front derailleur mounting plate 18 is mounted to bicycle frame 12.

The mounting projection 18f forms a second complementary mounting structure for aiding in the assembly of the bottom bracket 20 and the front derailleur mounting bracket 18 to the bottom bracket tube 16. The mounting projection 18f is configured to retain the front derailleur mounting bracket 18 in a predetermined rotational orientation and a predetermined axial orientation on an axial end edge of the bottom bracket tube 16 prior to threading of the bottom bracket 20 within the interior threaded passage of the bottom bracket tube 16. Accordingly, the installer needs to only insert a one end of the bottom bracket 20 within the interior threaded passage of the bottom bracket tube 16 to support the front derailleur mounting bracket 18 in the correct orientation. This allows to the installer to let go of the front derailleur mounting bracket 18 and use two hands to install the bottom bracket 20 within the interior threaded passage of the bottom bracket tube 16 with an air wrench.

The mounting projection 18f is preferably an L-shaped member or flange that is extends axially from the side 18a of the front derailleur mounting bracket 18 to engage the L-shaped slot 16c formed in the axial end edge of the bottom bracket tube 16. In other words, the L-shaped projection 18f has substantially the same shape as the L-shaped notch or slot 16c. Thus, the L-shaped projection 18f has a first axially extending section 18f' that corresponds to the open end 16c' of the L-shaped slot 16c and a second circumferential extending section 18f" that corresponds to the closed end 16c" of the L-shaped slot 16c. More specifically, the first axially extending section 18f' has a first circumferential width that is slightly smaller than the circumferential width of the open end 16c' of the L-shaped slot 16c. The second circumferential extending section 18f" has a first circumferential width that is slightly smaller than the circumferential width of the closed end 16c" of the L-shaped slot 16c. The second circumferential extending section 18f" is axially spaced from the side 18a of the front derailleur mounting bracket 18. Preferably, the L-shaped projection 18f is formed as a one-piece, unitary part of the front derailleur mounting bracket 18.

Still referring to FIGS. 5 and 6, the front derailleur mounting plate 18 also includes a chain guiding abutment 18h formed integral therewith. This construction prevents the chain 38 from falling between the small sprocket 40 and the front derailleur mounting plate 18. Specifically, this chain 38 guiding abutment 18h is located slightly below teeth of the intermediate sprocket 42, with an upper surface of the chain guiding abutment 18h inclined toward the small sprocket 40. The chain guiding abutment 18h is formed as one piece on the upper derailleur support portion 18d of the second side 18b for guiding the chain 38 to the small sprocket 40 and preventing the chain 38 from falling off the small sprocket 40 when the chain 38 is being shifted from the middle sprocket 42 to the small sprocket 40. As shown in FIG. 2, the chain guiding abutment 18h is positioned above the circle defined by the teeth of the small sprocket 40 and has an arcuate shape centered on the center of bottom bracket opening 18f. In this embodiment, the radial position of chain guiding abutment 18h is approximately 6.0 millimeters and more preferably 6.4 millimeters from the circle defined by the teeth of the small sprocket 40. Also, the laterally outermost edge of the chain guiding abutment 18h extends from about forty-five degrees to about eighty-five degrees counterclockwise from a horizontal axis that is perpendicular to a vertical axis that is centered relative to the arcuate inner peripheral surface of stationary frame attachment portion 88 and intersects the center of bottom bracket opening 18f. The chain guiding abutment 18h preferably has a portion disposed at least at approximately sixty-six degrees counterclockwise from the horizontal axis. Consequently, when the chain guide 30 is moved to change the chain 38 from the intermediate sprocket 42 to the small sprocket 40, the chain 38 disengaged from the intermediate sprocket 42 will contact the chain guiding abutment 18h to be guided by its upper surface to the small sprocket 40. In this way, the chain 38 is changed to the small sprocket 40 reliably instead of moving over the small sprocket 40 and falling between the sprocket 40 and the front derailleur mounting plate 18.

Second Embodiment

Figure 8:
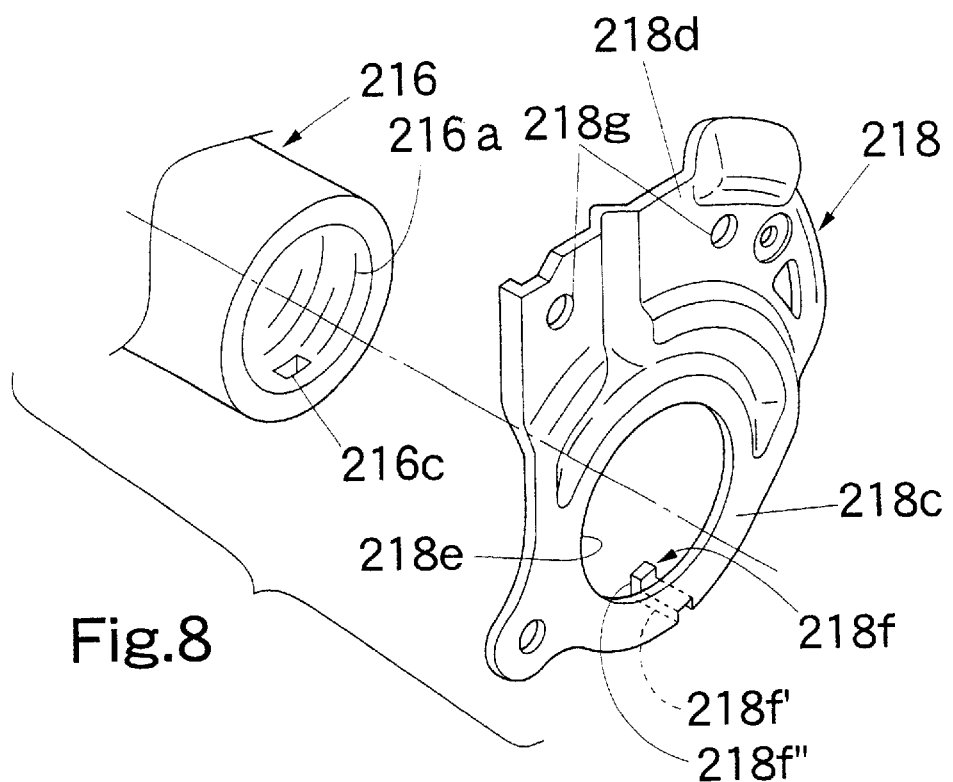
FIG. 8 is a partial exploded perspective view of a portion of the bottom bracket tube of the bicycle frame, the front derailleur mounting member and the bottom bracket in accordance with a second embodiment of the present invention.
Figure 9:
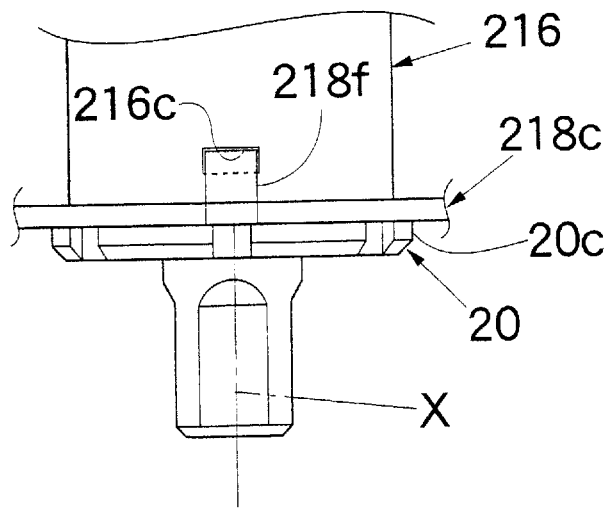
FIG. 9 is a partial bottom plan view of a portion of the bottom bracket tube of the bicycle frame with the front derailleur mounting member shown in partial cross section in accordance with the second embodiment of the present invention illustrated in FIG. 8.

Referring now to FIGS. 8 and 9, a modified bottom bracket tube 216 and a modified front derailleur mounting plate 218 form a front derailleur mounting arrangement in accordance with a second embodiment will now be explained. The bottom bracket tube 216 and the front derailleur mounting plate 218 are designed to be used with the front derailleur 14 and the bottom bracket 20 in the same manner as the first embodiment. In view of the similarity between the first and second embodiments, the descriptions of the parts of the second embodiment that are identical to the parts of the first embodiment may be omitted for the sake of brevity.

In this embodiment, the bottom bracket tube 216 has a threaded portion 216a with a closed slot 216c formed therein. The closed slot 216c forms a first complementary mounting structure for aiding in the assembly of the bottom bracket 20 and the front derailleur mounting bracket 218 to the bottom bracket tube 216. The slot 216c is configured to retain the front derailleur mounting bracket 218 in a predetermined rotational orientation and a predetermined axial orientation on an axial end edge of the bottom bracket tube 216 prior to threading of the bottom bracket 20 within the interior threaded passage of the bottom bracket tube. The slot 216c is shown as a rectangular hole or bore, but any shape can be used. Moreover, the slot 216c can extend completely or only partially through the wall of the bottom bracket tube 216.

The front derailleur mounting plate 218 is preferably a one-piece, unitary member having a lower attachment portion 218c and an upper derailleur support portion 218d extending from the lower attachment portion 218c. The lower attachment portion 218c has a bottom bracket opening 218e and a mounting projection 218f. The upper derailleur support portion 218d extends upwardly from the lower attachment portion 218c. The upper derailleur support portion 218d has a pair of holes 218g that form a derailleur mounting part.

In this embodiment, the mounting projection 218f forms a second complementary mounting structure for aiding in the assembly of the bottom bracket 20 and the front derailleur mounting bracket 218 to the bottom bracket tube 216. The mounting projection 218f is configured to retain the front derailleur mounting bracket 218 in a predetermined rotational orientation and a predetermined axial orientation on an axial end edge of the bottom bracket tube 216 prior to threading of the bottom bracket 20 within the interior threaded passage of the bottom bracket tube 216.

The mounting projection 218f is preferably an L-shaped member or flange that extends axially from the front derailleur mounting bracket 218 to engage the slot 216c formed in the bottom bracket tube 216. Thus, the L-shaped projection 218f has a first axially extending section 218f' and a second radially extending section 218f" that extends into the 216c. More specifically, the first axially extending section 218f' has a first length that is substantially equal to the distance between the axial end edge of the bottom bracket tube 216 and the slot 216c so that the second radially extending section 218f" extends into the slot 216c.

Third Embodiment

Figure 10:
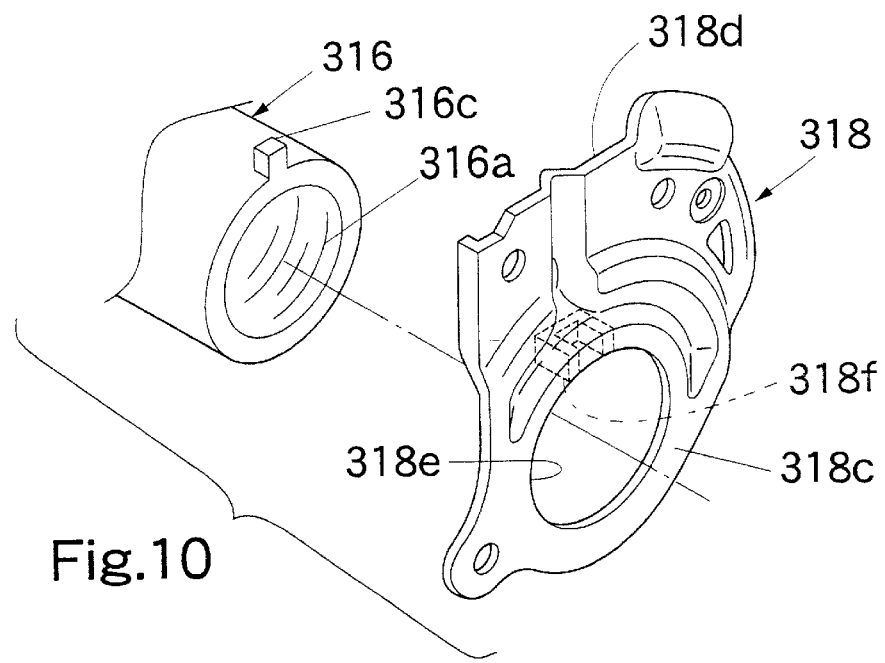
FIG. 10 is a partial exploded perspective view of a portion of the bottom bracket tube of the bicycle frame, the front derailleur mounting member and the bottom bracket in accordance with a third embodiment of the present invention.
Figure 11:
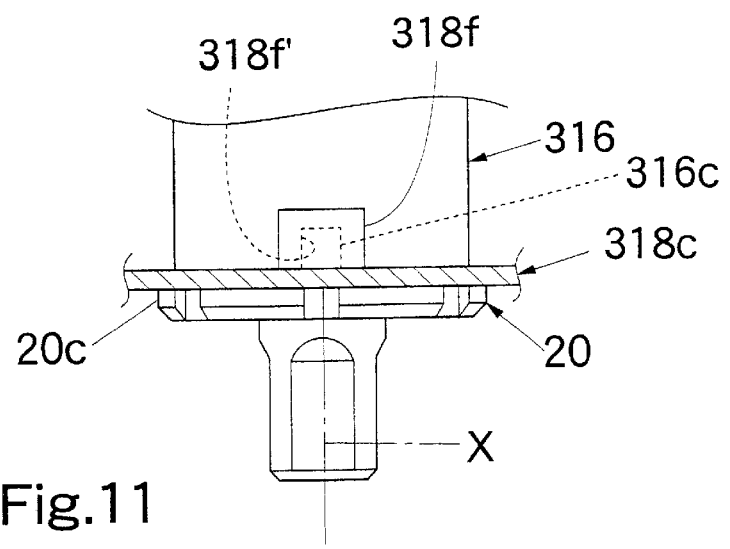
FIG. 11 is a partial top plan view of a portion of the bottom bracket tube of the bicycle frame with the front derailleur mounting member shown in partial cross section in accordance with the third embodiment of the present invention illustrated in FIG. 10.

Referring now to FIGS. 10 and 11, a modified bottom bracket tube 316 and a modified front derailleur mounting plate 318 form a front derailleur mounting arrangement in accordance with a third embodiment will now be explained. The bottom bracket tube 316 and the front derailleur mounting plate 318 are designed to be used with the front derailleur 14 and the bottom bracket 20 in the same manner as the first embodiment. In view of the similarity between the first and second embodiments, the descriptions of the parts of the third embodiment that are identical to the parts of the first embodiment may be omitted for the sake of brevity.

In this embodiment, the bottom bracket tube 316 has a threaded portion 316a with a projection 316c extending radially outwardly from the exterior of the bottom bracket tube 316. The projection 316c forms a first complementary mounting structure for aiding in the assembly of the bottom bracket 20 and the front derailleur mounting bracket 318 to the bottom bracket tube 316. The projection 316c is configured to retain the front derailleur mounting bracket 318 in a predetermined rotational orientation and a predetermined axial orientation on an axial end edge of the bottom bracket tube 316 prior to threading of the bottom bracket 20 within the interior threaded passage of the bottom bracket tube. The projection 316c is shown as a rectangular projection, but any shape can be used. Moreover, the projection 316c can be integrally formed as a unitary part of the wall of the bottom bracket tube 316, or can be a separate element that is attached thereto. If the projection 316c is a separate element, then projection 316c can be permanently or removably attached to the bottom bracket tube 316. If the projection 316c is removably attached to the bottom bracket tube 316, then the projection 316c can be formed so as to be axially adjusted.

The front derailleur mounting plate 318 is preferably a one-piece, unitary member having a lower attachment portion 318c and an upper derailleur support portion 318d extending from the lower attachment portion 318c. The lower attachment portion 318c has a bottom bracket opening 318e and a mounting member 318f with a slot or recess 318f'. The upper derailleur support portion 318d extends upwardly from the lower attachment portion 318c. The upper derailleur support portion 318d has a pair of holes 318g that form a derailleur mounting part.

In this embodiment, the slot 318f' of the mounting member 318f forms a second complementary mounting structure for aiding in the assembly of the bottom bracket 20 and the front derailleur mounting bracket 318 to the bottom bracket tube 316. The slot 318f' of the mounting member 318f is configured to retain the front derailleur mounting bracket 318 in a predetermined rotational orientation and a predetermined axial orientation on an axial end edge of the bottom bracket tube 316 prior to threading of the bottom bracket 20 within the interior threaded passage of the bottom bracket tube 316.

The mounting member 318f and the lower attachment portion 318c are preferably arranged to form an upside down cup-shaped member with the slot or recess 318f' formed on the downwardly facing surface of the mounting member 318f. The mounting member 318f extends axially from the front derailleur mounting bracket 318 so that the projection 316c formed on the bottom bracket tube 316 engages the slot or recess 318f' of the mounting member 318f. Thus, the front derailleur mounting bracket 318 is retained on the bottom bracket tube 316 to prevent axial or circumferential movements.

Fourth Embodiment

Figure 12:
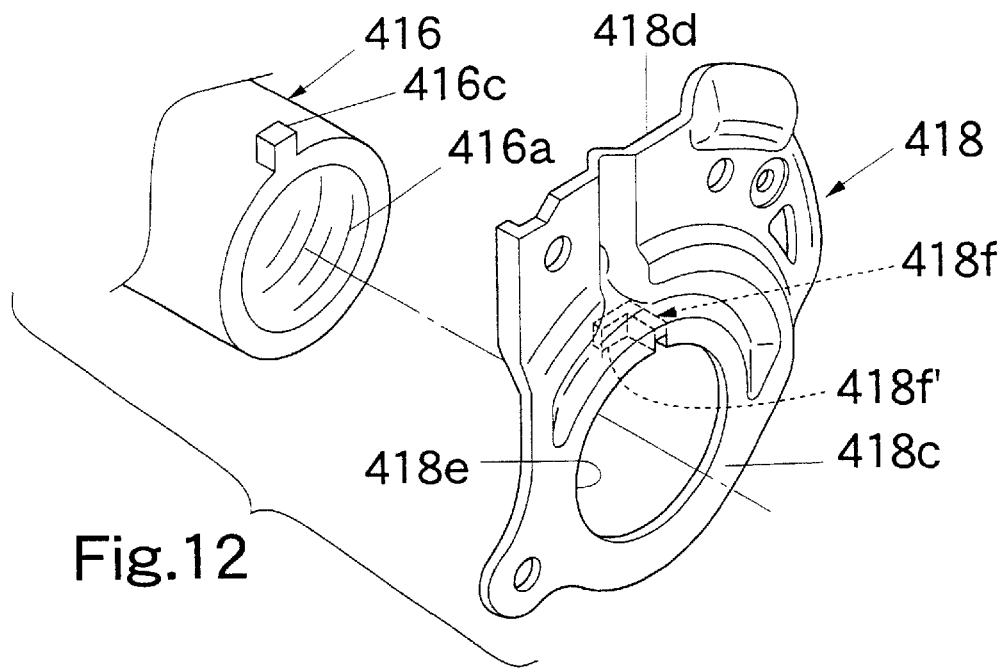
FIG. 12 is a partial exploded perspective view of a portion of the bottom bracket tube of the bicycle frame, the front derailleur mounting member and the bottom bracket in accordance with a fourth embodiment of the present invention.
Figure 13:
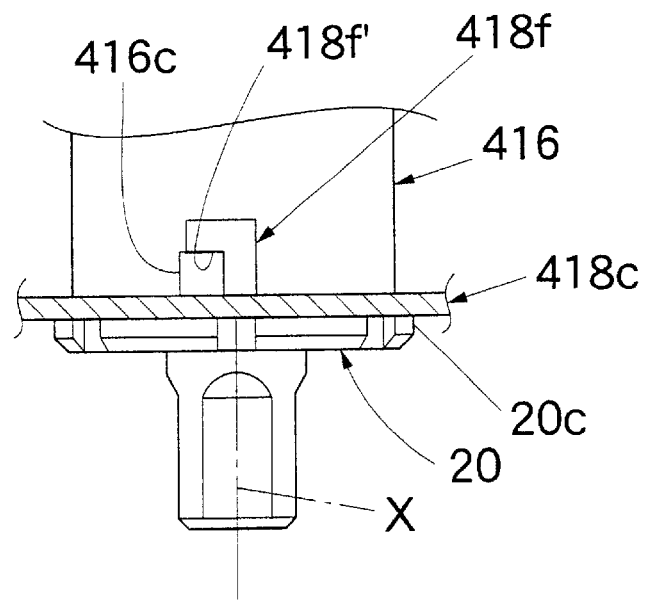
FIG. 13 is a partial top plan view of a portion of the bottom bracket tube of the bicycle frame with the front derailleur mounting member shown in partial cross section in accordance with the fourth embodiment of the present invention illustrated in FIG. 12.

Referring now to FIGS. 12 and 13, a modified bottom bracket tube 416 and a modified front derailleur mounting plate 418 form a front derailleur mounting arrangement in accordance with a fourth embodiment will now be explained. The bottom bracket tube 416 and the front derailleur mounting plate 418 are designed to be used with the front derailleur 14 and the bottom bracket 20 in the same manner as the first embodiment. In view of the similarity between the first and fourth embodiments, the descriptions of the parts of the second embodiment that are identical to the parts of the first embodiment may be omitted for the sake of brevity.

In this embodiment, the bottom bracket tube 416 has a threaded portion 416a with a projection 416c extending radially outwardly from the exterior of the bottom bracket tube 416. The projection 416c forms a first complementary mounting structure for aiding in the assembly of the bottom bracket 20 and the front derailleur mounting bracket 418 to the bottom bracket tube 416. The projection 416c is configured to retain the front derailleur mounting bracket 418 in a predetermined rotational orientation and a predetermined axial orientation on an axial end edge of the bottom bracket tube 416 prior to threading of the bottom bracket 20 within the interior threaded passage of the bottom bracket tube. The projection 416c is shown as a rectangular projection, but any shape can be used. Moreover, the projection 416c can be integrally formed as a unitary part of the wall of the bottom bracket tube 416, or can be a separate element that is attached thereto. If the projection 416c is a separate element, then projection 416c can be permanently or removably attached to the bottom bracket tube 416. If the projection 416c is removably attached to the bottom bracket tube 416, then the projection 416c can be formed so as to be axially adjusted.

The front derailleur mounting plate 418 is preferably a one-piece, unitary member having a lower attachment portion 418c and an upper derailleur support portion 418d extending from the lower attachment portion 418c. The lower attachment portion 418c has a bottom bracket opening 418e and a mounting flange 418f with a slot 418f'. The upper derailleur support portion 418d extends upwardly from the lower attachment portion 418c. The upper derailleur support portion 418d has a pair of holes 418g that form a derailleur mounting part.

In this embodiment, the slot 418f' of the mounting flange 418f forms a second complementary mounting structure for aiding in the assembly of the bottom bracket 20 and the front derailleur mounting bracket 418 to the bottom bracket tube 416. The slot 418f' of the mounting flange 418f is configured to retain the front derailleur mounting bracket 418 in a predetermined rotational orientation and a predetermined axial orientation on an axial end edge of the bottom bracket tube 416 prior to threading of the bottom bracket 20 within the interior threaded passage of the bottom bracket tube 416.

The mounting flange 418f is preferably an L-shaped member that extends axially from the front derailleur mounting bracket 418 so that the projection 416c formed on the bottom bracket tube 416 engages the slot 418f' of the mounting flange 418f. Thus, the front derailleur mounting bracket 418 is retained on the bottom bracket tube 416 to prevent axial or circumferential movements.

Fifth Embodiment

Figure 14:
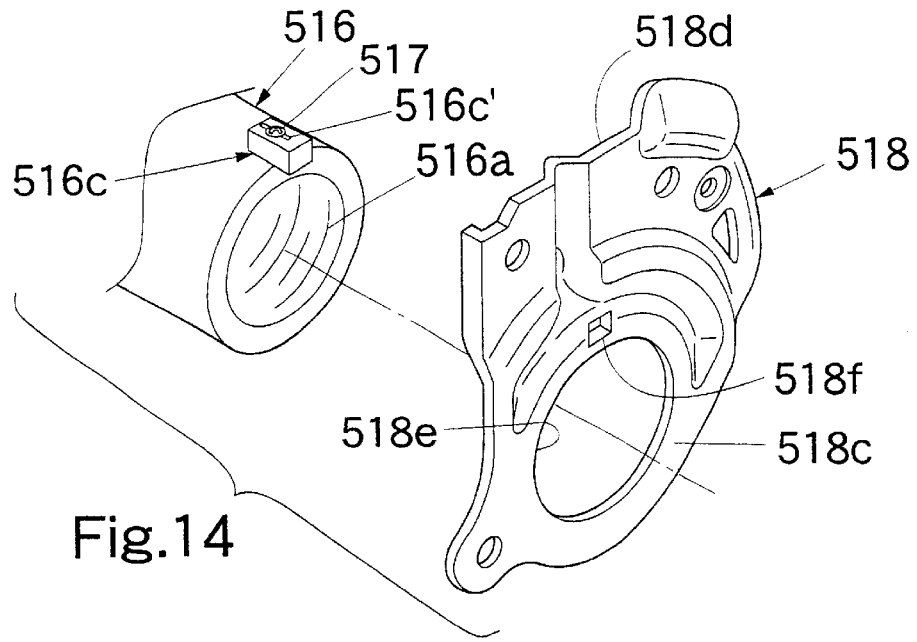
FIG. 14 is a partial exploded perspective view of a portion of the bottom bracket tube of the bicycle frame, the front derailleur mounting member and the bottom bracket in accordance with a fifth embodiment of the present invention.
Figure 15:
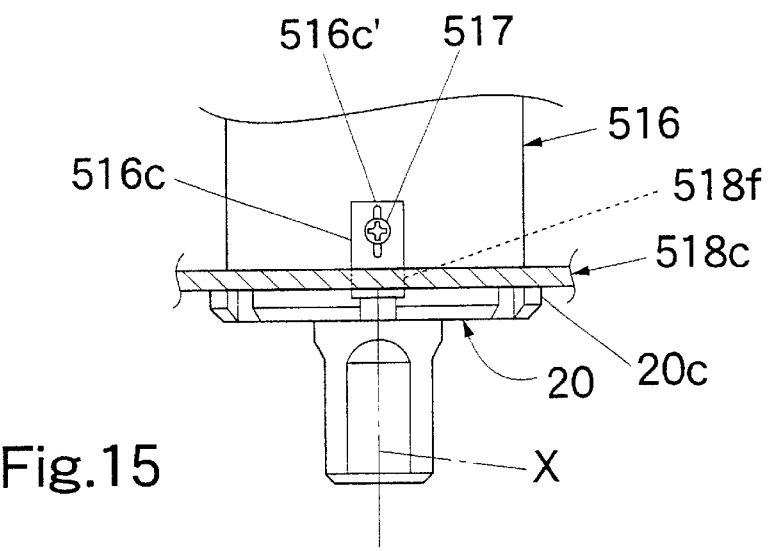
FIG. 15 is a partial top plan view of a portion of the bottom bracket tube of the bicycle frame with the front derailleur mounting member shown in partial cross section in accordance with the fifth embodiment of the present invention illustrated in FIG. 14.

Referring now to FIGS. 14 and 15, a modified bottom bracket tube 516 and a modified front derailleur mounting plate 518 form a front derailleur mounting arrangement in accordance with a fifth embodiment will now be explained. The bottom bracket tube 516 and the front derailleur mounting plate 518 are designed to be used with the front derailleur 14 and the bottom bracket 20 in the same manner as the first embodiment. In view of the similarity between the first and second embodiments, the descriptions of the parts of the fifth embodiment that are identical to the parts of the first embodiment may be omitted for the sake of brevity.

In this embodiment, the bottom bracket tube 516 has a threaded portion 516a with a projection 516c extending radially outwardly from the exterior of the bottom bracket tube 516. The projection 516c forms a first complementary mounting structure for aiding in the assembly of the bottom bracket 20 and the front derailleur mounting bracket 518 to the bottom bracket tube 516. The projection 516c is configured to retain the front derailleur mounting bracket 518 in a predetermined rotational orientation and a predetermined axial orientation on an axial end edge of the bottom bracket tube 516 prior to threading of the bottom bracket 20 within the interior threaded passage of the bottom bracket tube. The projection 516c is shown as a rectangular projection, but any shape can be used. Moreover, the projection 516c is removably attached to the bottom bracket tube 516 by a screw 517.

The projection 516c has a slot 516c' formed therein so that the projection 516c can be axially adjusted. Of course, the projection 516c can be integrally formed as a unitary part of the wall of the bottom bracket tube 516.

The front derailleur mounting plate 518 is preferably a one-piece, unitary member having a lower attachment portion 518c and an upper derailleur support portion 518d extending from the lower attachment portion 518c. The lower attachment portion 518c has a bottom bracket opening 518e and a mounting slot 518f. The upper derailleur support portion 518d extends upwardly from the lower attachment portion 518c. The upper derailleur support portion 518d has a pair of holes 518g that form a derailleur mounting part.

In this embodiment, the mounting slot 518f forms a second complementary mounting structure for aiding in the assembly of the bottom bracket 20 and the front derailleur mounting bracket 518 to the bottom bracket tube 516. The mounting slot 518f is configured to retain the front derailleur mounting bracket 518 in a predetermined rotational orientation and a predetermined axial orientation on an axial end edge of the bottom bracket tube 516 prior to threading of the bottom bracket 20 within the interior threaded passage of the bottom bracket tube 516.

The 516c extends axially from the bottom bracket tube 516 so that the projection 516c formed on the bottom bracket tube 516 engages the slot 518f of the front derailleur mounting bracket 518. Thus, the front derailleur mounting bracket 518 is retained on the bottom bracket tube 516 to prevent unassisted axial or circumferential movements. In this embodiment, the phrase "prevent unassisted axial movement" means that no axial movement occurs without an external force being applied thereto other than gravity when the bicycle 10 is on level ground in the upright position.

Sixth Embodiment

Figure 16:
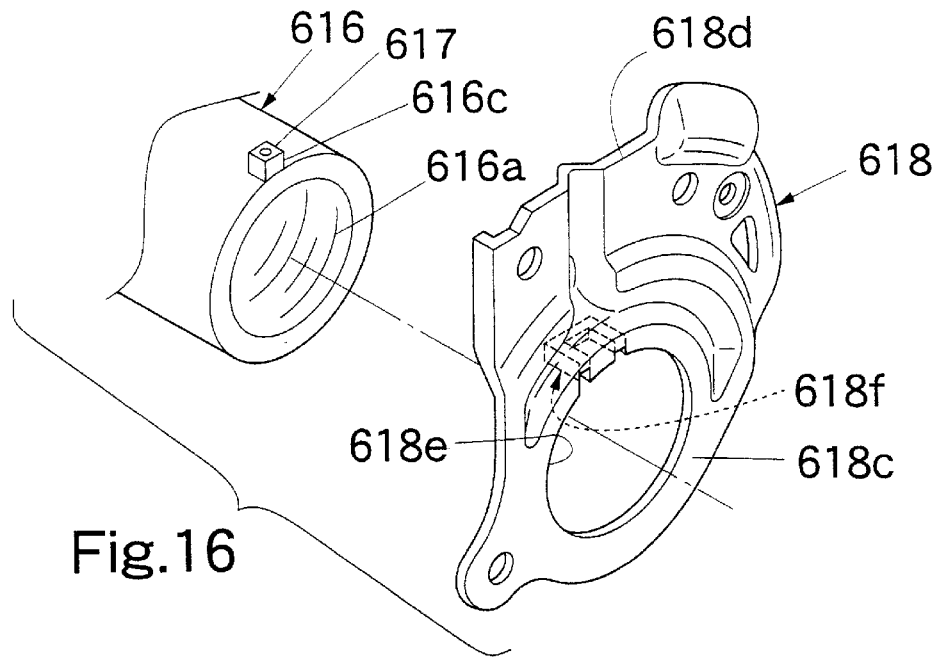
FIG. 16 is a partial exploded perspective view of a portion of the bottom bracket tube of the bicycle frame, the front derailleur mounting member and the bottom bracket in accordance with a sixth embodiment of the present invention.
Figure 17:
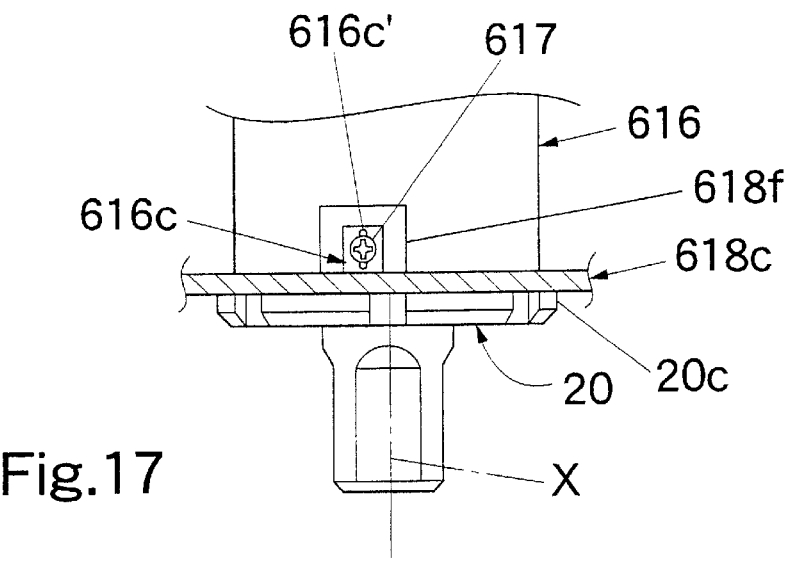
FIG. 17 is a partial top plan view of a portion of the bottom bracket tube of the bicycle frame with the front derailleur mounting member shown in partial cross section in accordance with the sixth embodiment of the present invention illustrated in FIG. 16.

Referring now to FIGS. 16 and 17, a modified bottom bracket tube 616 and a modified front derailleur mounting plate 618 form a front derailleur mounting arrangement in accordance with a sixth embodiment will now be explained. The bottom bracket tube 616 and the front derailleur mounting plate 618 are designed to be used with the front derailleur 14 and the bottom bracket 20 in the same manner as the first embodiment. In view of the similarity between the first and second embodiments, the descriptions of the parts of the sixth embodiment that are identical to the parts of the first embodiment may be omitted for the sake of brevity.

In this embodiment, the bottom bracket tube 616 has a threaded portion 616a with a projection 616c extending radially outwardly from the exterior of the bottom bracket tube 616. The projection 616c forms a first complementary mounting structure for aiding in the assembly of the bottom bracket 20 and the front derailleur mounting bracket 618 to the bottom bracket tube 616. The projection 616c is configured to retain the front derailleur mounting bracket 618 in a predetermined rotational orientation and a predetermined axial orientation on an axial end edge of the bottom bracket tube 616 prior to threading of the bottom bracket 20 within the interior threaded passage of the bottom bracket tube. The projection 616c is shown as a rectangular projection, but any shape can be used. Moreover, the projection 616c can be integrally formed as a unitary part of the wall of the bottom bracket tube 616, or can be a separate element that is attached thereto. Moreover, the projection 616c is removably attached to the bottom bracket tube 616 by a screw 617. The projection 616c has a slot 616c' formed therein so that the projection 616c can be axially adjusted. Of course, the projection 616c can be integrally formed as a unitary part of the wall of the bottom bracket tube 616.

The front derailleur mounting plate 618 is preferably a one-piece, unitary member having a lower attachment portion 618c and an upper derailleur support portion 618d extending from the lower attachment portion 618c. The lower attachment portion 618c has a bottom bracket opening 618e and a mounting flange 618f with a slot 618f'. The upper derailleur support portion 618d extends upwardly from the lower attachment portion 618c. The upper derailleur support portion 618d has a pair of holes 618g that form a derailleur mounting part.

In this embodiment, the slot 618f' of the mounting flange 618f forms a second complementary mounting structure for aiding in the assembly of the bottom bracket 20 and the front derailleur mounting bracket 618 to the bottom bracket tube 616. The slot 618f' of the mounting flange 618f is configured to retain the front derailleur mounting bracket 618 in a predetermined rotational orientation and a predetermined axial orientation on an axial end edge of the bottom bracket tube 616 prior to threading of the bottom bracket 20 within the interior threaded passage of the bottom bracket tube 616.

The mounting flange 618f is preferably a U-shaped member or flange that extends axially from the front derailleur mounting bracket 618 so that the projection 616c formed on the bottom bracket tube 616 engages the slot 618f' of the mounting flange 618f. Thus, the front derailleur mounting bracket 618 is retained on the bottom bracket tube 616 to prevent axial or circumferential movements.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A front derailleur mounting arrangement comprising:
   a bottom bracket tube having an interior threaded passage with a center axis and a first complementary mounting structure; and
   a front derailleur mounting bracket including
      a lower attachment portion with a bottom bracket opening and a second complementary mounting structure, and
      an upper derailleur support portion extending from said lower attachment portion and having a derailleur mounting part,
   one of said first and second complementary mounting structures being configured to form a slot with a first complementary surface and the other of said first and second complementary mounting structures being configured to form a projection with a second complementary surface that mates with said slot to retain said front derailleur mounting bracket in a predetermined rotational orientation and a predetermined axial orientation on an axial end edge of said bottom bracket tube prior to threading of a bottom bracket within said interior threaded passage of said bottom bracket tube, and said first and second complementary surfaces contacting each other to prevent axial separation of said front derailleur mounting bracket from said bottom bracket tube while said projection is located in said slot.

2. The front derailleur mounting arrangement according to claim 1, wherein
   said first complementary mounting structure is said slot formed in said bottom bracket tube, and said second complementary mounting structure is said projection formed on said front derailleur mounting bracket.

3. The front derailleur mounting arrangement according to claim 2, wherein
   said slot is formed in said axial end edge of said bottom bracket tube to form a notch with an open end located at said axial end edge of said bottom bracket tube and a closed end spaced axially from said axial end edge of said bottom bracket tube.

4. The front derailleur mounting arrangement according to claim 3, wherein
   said open end of said notch has a first circumferential width and said closed end of said notch has a second circumferential width that is no smaller than said first circumferential width.

5. The front derailleur mounting arrangement according to claim 4, wherein
   said second circumferential width is equal to said first circumferential width.

6. A front derailleur mounting arrangement comprising:
   a bottom bracket tube having an interior threaded passage with a center axis and a first complementary mounting structure; and
   a front derailleur mounting bracket including
      a lower attachment portion with a bottom bracket opening and a second complementary mounting structure, and
      an upper derailleur support portion extending from said lower attachment portion and having a derailleur mounting part,
   said first complementary mounting structure being a slot formed in an axial end edge of said bottom bracket tube to form a notch with an open end located at said axial end edge of said bottom bracket tube and a closed end spaced axially from said axial end edge of said bottom bracket tube, and
   said second complementary mounting structure being a projection formed on said front derailleur mounting bracket that mates with said slot to retain said front derailleur mounting bracket in a predetermined rotational orientation and a predetermined axial orientation on said axial end edge of said bottom bracket tube prior to threading of a bottom bracket within said interior threaded passage of said bottom bracket tube,
   said open end of said notch having a first circumferential width and said closed end of said notch having a second circumferential width that is smaller than said first circumferential width.

7. A front derailleur mounting arrangement comprising:
   a bottom bracket tube having an interior threaded passage with a center axis and a first complementary mounting structure; and a front derailleur mounting bracket including
  a lower attachment portion with a bottom bracket opening and a second complementary mounting structure, and
  an upper derailleur support portion extending from said lower attachment portion and having a derailleur mounting part,
said first complementary mounting structure being a slot formed in an axial end edge of said bottom bracket tube to form a notch with an open end located at said axial end edge of said bottom bracket tube and a closed end spaced axially from said axial end edge of said bottom bracket tube, and
said second complementary mounting structure being a projection formed on said front derailleur mounting bracket that mates with said slot to retain said front derailleur mounting bracket in a predetermined rotational orientation and a predetermined axial orientation on said axial end edge of said bottom bracket tube prior to threading of a bottom bracket within said interior threaded passage of said bottom bracket tube,
said projection including a first section extending axially from said lower attachment portion, and a second section extending circumferential from said first section and spaced axially from said lower attachment portion, and said slot having a substantially corresponding shape as said first and second sections of said projection.

8. The front derailleur mounting arrangement according to claim 2, wherein
said slot is a bore spaced from said axial end edge of said bottom bracket tube.

9. A front derailleur mounting arrangement comprising:
a bottom bracket tube having an interior threaded passage with a center axis and a first complementary mounting structure; and
a front derailleur mounting bracket including
  a lower attachment portion with a bottom bracket opening and a second complementary mounting structure, and
  an upper derailleur support portion extending from said lower attachment portion and having a derailleur mounting part,
said first complementary mounting structure being a slot formed in said bottom bracket tube, and
said second complementary mounting structure being a projection formed on said front derailleur mounting bracket that mates with said slot to retain said front derailleur mounting bracket in a predetermined rotational orientation and a predetermined axial orientation on an axial end edge of said bottom bracket tube prior to threading of a bottom bracket within said interior threaded passage of said bottom bracket tube,
said slot being a bore spaced from said axial end edge of said bottom bracket tube,
said bore extending completely through a wall of said bottom bracket tube.

10. The front derailleur mounting arrangement according to claim 1, wherein
said first complementary mounting structure is said projection formed on said bottom bracket tube, and said second complementary mounting structure is said slot formed in said front derailleur mounting bracket.

11. The front derailleur mounting arrangement according to claim 10, wherein
said slot extends in an axial direction to form a notch with an open end spaced axially from said lower attachment portion and a closed end formed adjacent said lower attachment portion.

12. The front derailleur mounting arrangement according to claim 11, wherein
said open end of said notch has a first circumferential width and said closed end of said notch has a second circumferential width that is no smaller than said first circumferential width.

13. A front derailleur mounting arrangement comprising:
a bottom bracket tube having an interior threaded passage with a center axis and a first complementary mounting structure; and
a front derailleur mounting bracket including
  a lower attachment portion with a bottom bracket opening and a second complementary mounting structure, and
  an upper derailleur support portion extending from said lower attachment portion and having a derailleur mounting part,
said first complementary mounting structure being a projection formed on said bottom bracket tube, and
said second complementary mounting structure being a slot formed in said front derailleur mounting bracket that mates with said projection to retain said front derailleur mounting bracket in a predetermined rotational orientation and a predetermined axial orientation on an axial end edge of said bottom bracket tube prior to threading of a bottom bracket within said interior threaded passage of said bottom bracket tube,
said slot being a bore formed in a flange extending axially from said lower attachment portion.

14. The front derailleur mounting arrangement according to claim 10, wherein
said projection is permanently secured on said bottom bracket tube.

15. The front derailleur mounting arrangement according to claim 10, wherein
said projection is formed as a one-piece, unitary part of said bottom bracket tube.

16. A front derailleur mounting arrangement comprising:
a bottom bracket tube having an interior threaded passage with a center axis and a first complementary mounting structure; and
a front derailleur mounting bracket including
  a lower attachment portion with a bottom bracket opening and a second complementary mounting structure, and
  an upper derailleur support portion extending from said lower attachment portion and having a derailleur mounting part,
said first complementary mounting structure being a projection formed on said bottom bracket tube, and
said second complementary mounting structure being a slot formed in said front derailleur mounting bracket that mates with said projection to retain said front derailleur mounting bracket in a predetermined rotational orientation and a predetermined axial orientation on an axial end edge of said bottom bracket tube prior to threading of a bottom bracket within said interior threaded passage of said bottom bracket tube,
said projection being removably secured to said bottom bracket tube by a fastener.

17. A front derailleur mounting arrangement adapted to be used with a bottom bracket tube having an interior threaded passage with a center axis and a first complementary mounting structure with a first complementary surface, said front derailleur mounting arrangement comprising:

a front derailleur mounting bracket including a lower attachment portion with a bottom bracket opening and a second complementary mounting structure with a second complementary surface, and an upper derailleur support portion extending from said lower attachment portion and having a derailleur mounting part, said second complementary mounting structure being configured to form at least one of a slot and a projection that mates with the first complementary mounting structure to retain said front derailleur mounting bracket in a predetermined rotational orientation and a predetermined axial orientation on an axial end edge of the bottom bracket tube prior to threading of a bottom bracket within the interior threaded passage of the bottom bracket tube, and said first and second complementary surfaces contacting each other to prevent axial separation of said front derailleur mounting bracket from said bottom bracket tube.

18. The front derailleur mounting arrangement according to claim 17, wherein said second complementary mounting structure is said projection formed on said front derailleur mounting bracket.

19. A front derailleur mounting arrangement adapted to be used a bottom bracket tube having an interior threaded passage with a center axis and a first complementary mounting structure, said front derailleur mounting arrangement comprising:

a front derailleur mounting bracket including a lower attachment portion with a bottom bracket opening and a second complementary mounting structure, and an upper derailleur support portion extending from said lower attachment portion and having a derailleur mounting part, said second complementary mounting structure being configured to form at least a projection on said front derailleur mounting bracket that mates with the first complementary mounting structure to retain said front derailleur mounting bracket in a predetermined rotational orientation and a predetermined axial orientation on an axial end edge of the bottom bracket tube prior to threading of a bottom bracket within the interior threaded passage of the bottom bracket tube, said projection including a first section extending axially from said lower attachment portion, and a second section extending circumferential from said first section and spaced axially from said lower attachment portion.

20. The front derailleur mounting arrangement according to claim 17, wherein said second complementary mounting structure is said slot formed on said front derailleur mounting bracket.

21. The front derailleur mounting arrangement according to claim 20, wherein said slot extends in an axial direction to form a notch with an open end spaced axially from said lower attachment portion and a closed end formed adjacent said lower attachment portion.

22. The front derailleur mounting arrangement according to claim 21, wherein said open end of said notch has a first circumferential width and said closed end of said notch has a second circumferential width that is no smaller than said first circumferential width.

23. A front derailleur mounting arrangement adapted to be used with a bottom bracket tube having an interior threaded passage with a center axis and a first complementary mounting structure, said front derailleur mounting arrangement comprising:

a front derailleur mounting bracket including a lower attachment portion with a bottom bracket opening and a second complementary mounting structure, and an upper derailleur support portion extending from said lower attachment portion and having a derailleur mounting part, said second complementary mounting structure being configured to form at least a slot on said front derailleur mounting bracket that mates with the first complementary mounting structure to retain said front derailleur mounting bracket in a predetermined rotational orientation and a predetermined axial orientation on an axial end edge of the bottom bracket tube prior to threading of a bottom bracket within the interior threaded passage of the bottom bracket, said slot being a bore formed in a flange extending axially from said lower attachment portion.

24. A front derailleur mounting arrangement comprising:

a bottom bracket tube having an interior threaded passage with a center axis and a first complementary mounting structure; and a front derailleur mounting bracket including a lower attachment portion with a bottom bracket opening and a second complementary mounting structure, and an upper derailleur support portion extending from said lower attachment portion and having a derailleur mounting part, one of said first and second complementary mounting structures being configured to form a slot and the other of said first and second complementary mounting structures being configured to form a projection that mates with said slot to self support said front derailleur mounting bracket in a predetermined rotational orientation and a predetermined axial orientation on an axial end edge of said bottom bracket tube and to prevent unassisted axial movement and circumferential movement prior to threading of a bottom bracket within said interior threaded passage of said bottom bracket tube.

25. The front derailleur mounting arrangement according to claim 24, wherein said first complementary mounting structure is said projection formed on said bottom bracket tube, and said second complementary mounting structure is said slot formed in said front derailleur mounting bracket.

26. The front derailleur mounting arrangement according to claim 25, wherein said slot is a bore formed in a flange extending axially from said lower attachment portion.

27. The front derailleur mounting arrangement according to claim 25, wherein said projection is permanently secured on said bottom bracket tube.

28. The front derailleur mounting arrangement according to claim 25, wherein said projection is formed as a one-piece, unitary part of said bottom bracket tube.

29. The front derailleur mounting arrangement according to claim 25, wherein said projection is removably secured to said bottom bracket tube by a fastener.

30. A front derailleur mounting arrangement adapted to be used with a bottom bracket tube having an interior threaded passage with a center axis and a first complementary mounting structure, said front derailleur mounting arrangement comprising:

a front derailleur mounting bracket including a lower attachment portion with a bottom bracket opening and a second complementary mounting structure, and an upper derailleur support portion extending from said lower attachment portion and having a derailleur mounting part, said second complementary mounting structure being configured to form at least one of a slot and a projection that mates with the first complementary mounting structure to self support said front derailleur mounting bracket in a predetermined rotational orientation and a predetermined axial orientation on an axial end edge of the bottom bracket tube and to prevent unassisted axial movement and circumferential movement prior to threading of a bottom bracket within the interior threaded passage of the bottom bracket tube.

31. The front derailleur mounting arrangement according to claim 30, wherein said second complementary mounting structure is said slot formed on said front derailleur mounting bracket.

32. The front derailleur mounting arrangement according to claim 31, wherein said slot is a bore formed in a flange extending axially from said lower attachment portion.

* * * * *